No. 629,929. Patented Aug. 1, 1899.
T. J. SHREEVE.
FEATHER RENOVATOR.
(Application filed Oct. 18, 1898.)

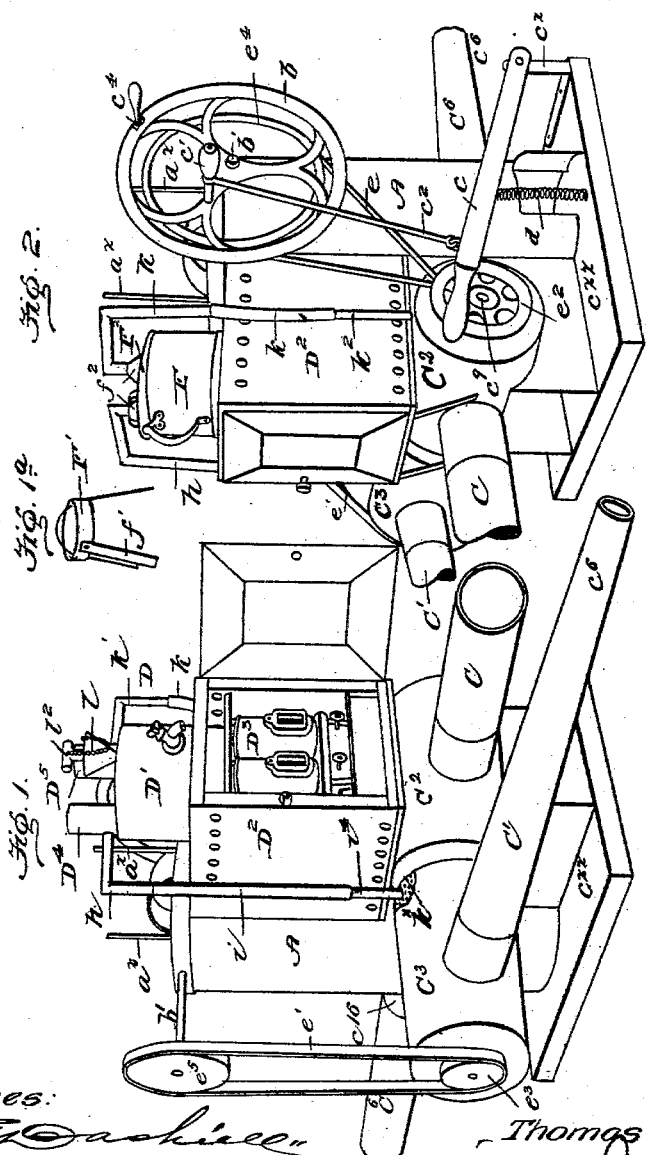

(No Model.) 2 Sheets—Sheet 2.

Witnesses:

Inventor
Thomas J. Shreeve

UNITED STATES PATENT OFFICE.

THOMAS J. SHREEVE, OF UNIONTOWN, MARYLAND.

FEATHER-RENOVATOR.

SPECIFICATION forming part of Letters Patent No. 629,929, dated August 1, 1899.

Application filed October 18, 1898. Serial No. 693,891. (No model.)

*To all whom it may concern:*

Be it known that I, THOMAS J. SHREEVE, a citizen of the United States, residing at Uniontown, in the county of Carroll and State of Maryland, have invented certain new and useful Improvements in a Combined Feather Renovator, Disinfector, and Fumigator; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a combined feather renovator and disinfector, which is adapted to serve as a fumigator.

It has for its objects, among other things, to thoroughly renovate or clean the feathers, to effectively separate any conglomeration thereof, and to disinfect and fumigate the same; also, for fumigating purposes generally; to provide for the collecting and separate disposition of the down, to take the feathers from and after renovation return them to the same tick or to take them from one tick and after cleaning deliver them to another tick, and to provide for the portability of the disinfector for its separate use from the renovator.

It consists of certain contrivances or devices for carrying out the above objects, including the construction and arrangement of the individual parts, substantially as hereinafter disclosed, and specifically pointed out in the claims.

Figure 3:
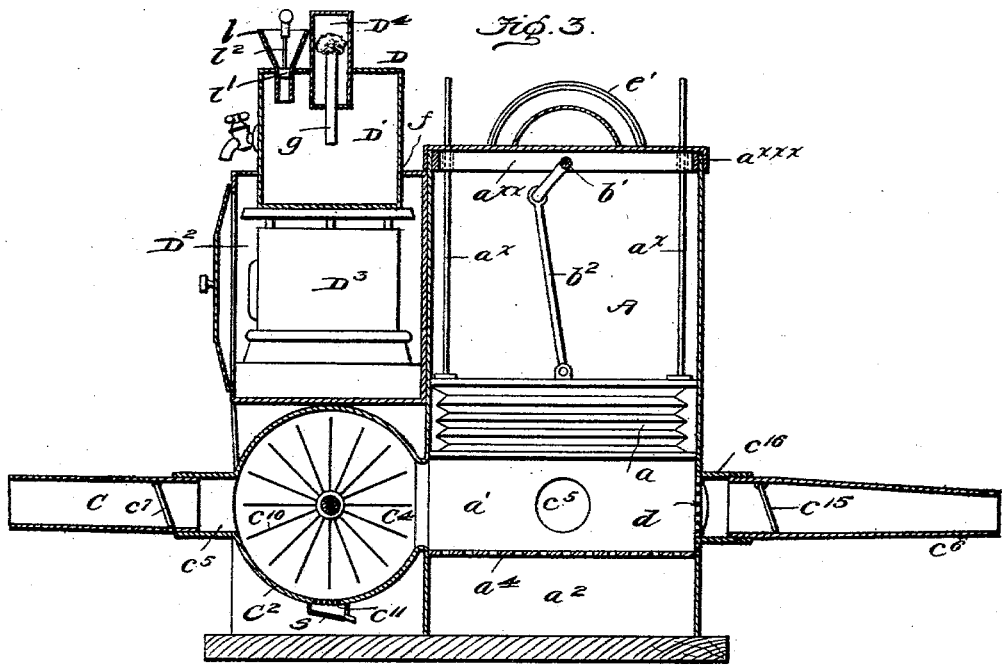
Figure 4:
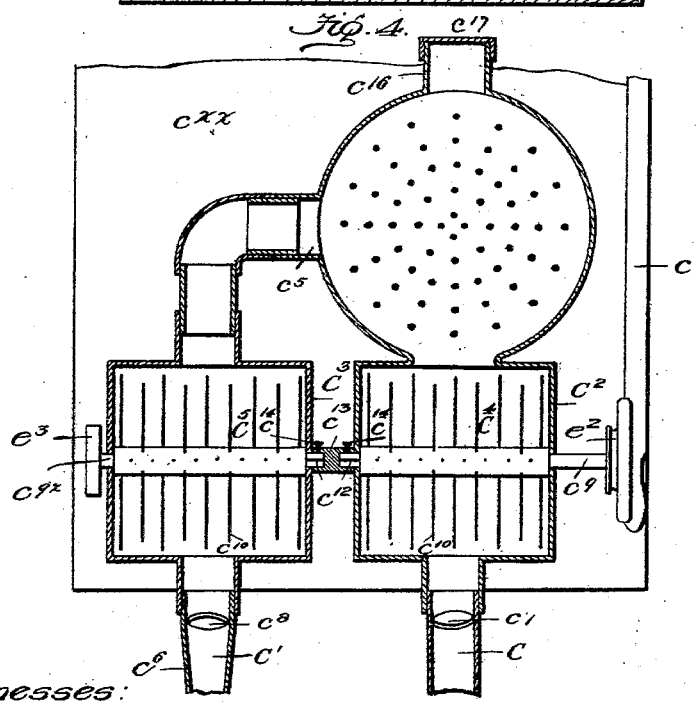

In the accompanying drawings, embodying the preferred form of carrying out my invention, Figures 1 and 2 are perspective views thereof, parts being broken away. Fig. 1ª is a detailed perspective view showing the receptacle for holding the fumigating substance. Figs. 3 and 4 are a vertical and a horizontal section of the same, respectively.

In the embodiment of my invention I employ a suction apparatus comprising an upright cylinder or chamber A, within which is suitably arranged a bellows $a$, opening downward, suitably actuated through a hand-operated wheel $b$, its crank-shaft $b'$, and pitman $b^2$, connecting said crank-shaft with said bellows, the bellows being guided and prevented from binding in its action by guide-rods $a^\times$, secured to the top of said bellows and passing through a cross-bar $a^{\times\times}$ of a circular frame $a^{\times\times\times}$, secured in the upper end of said cylinder. The wheel $b$ is also adapted to be actuated by a lever $c$, suitably pivoted at one end upon a preferably angle-bar $c^\times$, secured to a base $c^{\times\times}$, upon which the cylinder A is mounted, said lever being connected to the handle $c'$ by a pitman or rod $c^2$. The lever $c$ may be aided in its upward stroke by the action of a spring secured to the base $c^{\times\times}$, the recoil of which after the depression of said lever will act upwardly upon the lever. When the handle $c'$ is to be grasped for use by the hand, it is removed from the position it is shown in, the pitman or rod $c^2$ then being disconnected therefrom and screwed into the side of the wheel at its periphery at $c^4$. This twofold way of actuating the wheel $b$ affords relaxation for the operator, as will be readily appreciated. Of course it will be understood that instead of operating the machine by hand this may be done mechanically or electrically by making the proper connection between the wheel $b$ and a motive power of the character intimated. Below the bellows $a$, within the cylinder A, is the suction-chamber $a'$, into which the feathers enter or are drawn by the suction action of the bellows, and below this chamber is the dust-box $a^2$, separated therefrom by a foraminous partition $a^4$ to permit the passage downward therethrough of the siftings from the feathers under the downward action or movement of the bellows and the action of the stirrers or agitators, hereinafter described.

C C' are two pipes—one, C, the inlet-pipe and the other, C', the outlet-pipe—for the feathers, connecting with the cylinder A, one in alinement with the suction-chamber $a$ to feed the feathers thereinto and deliver them therefrom, respectively. The outlet-pipe C' is adapted to be connected laterally with a substantially right-angled nozzle $c^5$ on said cylinder, permitting said outlet-pipe to extend parallel with the inlet-pipe. The delivery end of the pipe is contracted or tapered, as at $c^6$, as is also the same end of the down-pipe, hereinafter described, to provide for increasing the impelling force or pressure within said pipes, as readily understood, expediting the passage of the feathers and down through their respective pipes and "spurting" or ejecting them therefrom to effect their delivery entirely clear of and preventing their possible clogging or lodging within the pipes, as greatly desired. In these pipes are arranged or hung oppositely-opening valves $c^7$ $c^8$, respectively, to guard against the alternate suction and blast action of the bellows upon the feathers passing through said pipes. Each of these pipes has also formed with it a transverse drum or chamber $C^2$ $C^3$, respectively, intermediarily of its length, and within each drum or chamber is arranged an agitator or stirrer $C^4$ $C^5$, respectively, comprising a shaft $c^9$ $c^{9\times}$, respectively, suitably journaled in the chamber and having numerous radial arms $c^{10}$ adapted to act in the line of the travel of the feathers and thereupon as they pass through said chambers or drums under the suction action of the bellows to separate any which may have become conglomerated or stuck together and to aid the cleaning or renovation of the same. In the bottom of each transverse drum or chamber is provided a series of fine perforations or apertures $c^{11}$, opening on the outside into an incline-bottomed drain $s$ to discharge water of condensation entering the chambers $C^2$ $C^3$ from the condensation of steam, which may be drawn thereinto by the suction action of the bellows. The shafts $c^9$ $c^{9\times}$ are adapted to be coupled together, said shafts being provided with opposite angular terminals $c^{12}$, adapted to be connected by a correspondingly-socketed coupling or sleeve $c^{13}$, fitted thereto and adapted to be held by set-screws $c^{14}$, as shown. While thus providing for stirring or acting upon the feathers both as they enter the machine and as they leave it, the failure to effectively treat each individual feather or to separate any stuck together or conglomerated is reduced to the minimum, therefore insuring the thorough and effective treatment or cleaning of the feathers. The stirrers or agitators are rotated, preferably, by suitable belts $e$ $e'$, compassing pulleys $e^2$ $e^3$ on their shafts and pulleys $e^4$ $e^5$, one secured directly on the shaft $b$ and the other on the hand-actuated wheel $b'$, thus transmitting motion thereto.

$C^6$ is what I term the "down-pipe" for the passage therethrough of the down produced by the agitation and passing of the feathers into said suction-chamber, said down-pipe having a valve $c^{15}$ and a removable foraminous or finely-perforated disk or diaphragm $d$ inserted therein, as shown, said disk or diaphragm having a wire handhold $d'$ secured to its opposite edges to permit its ready attachment and removal when desired. This pipe is adapted to be removably inserted or slipped upon a nozzle $c^{16}$, secured to the cylinder A at the back, to permit of the disposition and delivering of the down, a suitable receptacle or tick being provided for its reception upon leaving the pipe $C^6$.

With the inlet and outlet pipes C C' arranged as above described and each inserted into the tick it will be seen that the feathers are withdrawn from the tick by the suction action aforesaid and as the feathers are passed through the machine and renovated or cleaned and disinfected they are delivered clean into the same tick, or by removing the foraminous partition or diaphragm from the down-pipe and inserting the end of the latter into an empty tick it will be seen that two ticks can be filled with feathers at the same time, the regular feather-discharging or outlet pipe having its end inserted into the other tick. Also by removing the foraminous diaphragm from the down-pipe proper and the outlet-pipe from its elbow $c^5$ and inserting said diaphragm into said nozzle or elbow and then restoring the outlet-pipe the down can be passed in the cleaning operation of the feathers to the front, and thus be delivered into a suitable receptacle or tick, the feathers being delivered out through what was previously the down-pipe at the back, or, if desired, the back pipe can be closed by slipping thereon a cap $c^{17}$ and the down and feathers all be discharged together into the tick.

D is a portable disinfector comprising a steam generator or cylinder D' and a preferably rectangular receptacle or closure $D^2$, adapted to contain an ordinary lamp-stove $D^3$, said closure being suitably and preferably seated upon a platform or plate secured for convenience upon the inlet-pipe C, said closure or receptacle having a circular opening $f$ through its top plate to let the steam generator or cylinder pass down therethrough and rest upon the lamp-stove for vaporizing of the disinfectant and the generation of steam in said cylinder. In the top plate or head of the cylinder D' are set or fixed two chambers $D^4$ $D^5$, extending above and down into said cylinder, and communicating with the steam-chamber of said cylinder, while in said chambers $D^4$ $D^5$ is placed ammonia or other suitable liquid disinfectant to unite with the steam as the same enters the chambers $C^2$ $C^3$ to cut the oil and other animal matter from the feathers.

To an elbow $h$ of the chamber $D^4$ is connected, preferably, a rubber hose $i$, reaching down and adapted to connect with or slipped upon a nozzle $i'$ of one of the stirrer cases or drums to pass the steam and vaporized disinfectant thus converted by the action of the steam from the chamber D' into said stirrer-case in contact with the feathers. A second hose $k$, connected to a similar elbow $k'$ of the chamber $D^5$, is similarly connected to a nozzle $k^2$ of the other stirrer-case to pass steam and disinfectant thereinto in contact with the feathers as they pass therethrough, thus subjecting the feathers to a twofold treatment of the disinfectant and steam. Each of the nozzles $i'$ $k^2$ has its inner end guarded by a foraminous plate or wire net to prevent the passing up thereinto of down or light particles and clogging the same.

In the top of the steam generator or cylinder D' is screwed or secured a funnel $l$ for conveniently supplying the same with water, and in the tubular portion of said funnel is inserted a plug $l'$, having a preferably ring ended or handled rod or stem $l^2$, adapted to provide for the ready unscrewing and removal of said plug.

F is a receptacle adapted to be let into the closure $D^2$, containing the oil-stove or heater $D^3$, and within the receptacle F is adapted to be placed a vessel F', preferably in the form of a cup secured upon legs $f$, elevating it near the upper open end of said receptacle. The cup or vessel F' is designed to contain a suitable fumigating substance the character of which is well known and the fumes of which are to be utilized for treating infectious feathers when occasion arises. To this end the cover $f'$ of the receptacle F is provided with right-angled inverted funnel-like nozzles $f^2$, upon which are slipped or inserted the upper ends of the hose or pipes $i\ k$, previously detached from the nozzles of the disinfectant-chambers, the lower ends of said hose or pipes remaining connected to the chambers containing the stirrers or agitators.

It is obvious that the device can be used for disinfecting purposes generally about a house or elsewhere—as, for instance, in treating infected bedsteads or other articles of furniture for destroying bedbugs, insects, &c.—in which case corrosive sublimate, oil of sassafras, and carbolic acid, combined with the steam, are used.

Having thus fully described my invention, what I claim, and desire to secure by Letters Patent, is—

1. The combination of an air-suction apparatus, the valved inlet and outlet pipes connected with the latter, each having a transverse drum or chamber provided with a stirrer or agitator, a steam-generator, disinfector-chambers let into the steam-chamber of said generator, and each provided with an open-ended steam-inlet tube and connected by hose or pipes with said agitator or stirrer chambers, and means for actuating said air-suction apparatus and agitators or stirrers, substantially as set forth.

2. The combination of the air-suction apparatus, a chamber arranged in connection therewith, and having a down-pipe provided with a foraminous disk or plate, and a valve, valved inlet and outlet pipes, one connected to said chamber and the other detachable, each of said inlet and outlet pipes having a transverse drum or chamber provided with a stirrer or agitator, a steam-generator, disinfectant-chambers let into the steam-chamber of said generator, and each provided with an open-ended steam-inlet tube, and connected by hose or pipes with said agitator or stirrer chambers, and means for actuating said agitators or stirrers and suction apparatus, substantially as set forth.

3. The combination of the suction apparatus, a chamber arranged in connection therewith, and having a valved down-pipe, valved inlet and outlet pipes connected to said suction apparatus, each having a transverse drum or chamber provided with a stirrer or agitator, a removable foraminous disk or plate adapted to be applied to either said down-pipe or said outlet-pipe for the purpose set forth, means to actuate said stirrers and suction apparatus, a steam-generator, and a disinfector said disinfector adapted to receive steam from the steam-generator and to deliver steam and disinfectant into the drums or chambers of said stirrers or agitators, substantially as set forth.

In testimony whereof I affix my signature in presence of two witnesses.

THOS. J. SHREEVE.

Witnesses:
   CHAS. P. BAILE,
   L. H. DIELMAN.